US012778134B2

(12) United States Patent
Mekhail et al.

(10) Patent No.: US 12,778,134 B2
(45) Date of Patent: Nov. 3, 2026

(54) COMPOSTABLE ANTI-MICROBIAL FILM AND METHOD OF APPLYING FILM TO PACKAGING

(71) Applicant: Impactful Health Research and Development Inc., Dartmouth (CA)

(72) Inventors: Mina Mekhail, Montreal (CA); Laila Benameur, Montreal (CA)

(73) Assignee: Freshr Sustainable Technologies Inc., Dartmouth (CA)

( * ) Notice: Subject to any disclaimer, the term of this patent is extended or adjusted under 35 U.S.C. 154(b) by 821 days.

(21) Appl. No.: 17/802,616

(22) PCT Filed: Feb. 26, 2021

(86) PCT No.: PCT/CA2021/050247
§ 371 (c)(1),
(2) Date: Aug. 26, 2022

(87) PCT Pub. No.: WO2021/168581
PCT Pub. Date: Sep. 2, 2021

(65) Prior Publication Data

US 2023/0263170 A1 Aug. 24, 2023

Related U.S. Application Data

(60) Provisional application No. 62/983,131, filed on Feb. 28, 2020.

(51) Int. Cl.

| | |
|---|---|
| ***A01N 63/50*** | (2020.01) |
| ***A01N 25/10*** | (2006.01) |
| ***A01P 1/00*** | (2006.01) |
| ***B65D 65/42*** | (2006.01) |
| ***B65D 65/46*** | (2006.01) |
| ***B65D 81/24*** | (2006.01) |
| ***C08J 5/18*** | (2006.01) |
| ***C08J 7/16*** | (2006.01) |
| ***C09D 189/00*** | (2006.01) |

(52) U.S. Cl.
CPC ............. *A01N 63/50* (2020.01); *A01N 25/10* (2013.01); *A01P 1/00* (2021.08); *B65D 65/42* (2013.01); *B65D 65/466* (2013.01); *B65D 81/24* (2013.01); *C08J 5/18* (2013.01); *C08J 7/16* (2013.01); *C09D 189/00* (2013.01); *C08J 2367/02* (2013.01); *C08J 2405/00* (2013.01); *C08J 2489/00* (2013.01); *C08K 2201/018* (2013.01)

(58) Field of Classification Search
CPC ................ C08J 2405/00; C08J 2489/00; C08J 2367/02; C08J 5/18; A01N 63/50
See application file for complete search history.

(56) References Cited

U.S. PATENT DOCUMENTS

| | | | | |
|---|---|---|---|---|
| 5,728,420 | A * | 3/1998 | Keogh | A61L 33/0029 427/2.12 |
| 6,976,997 | B2 * | 12/2005 | Noolandi | B82Y 30/00 623/5.14 |
| 2004/0137041 | A1 | 7/2004 | You et al. | |
| 2009/0011160 | A1 | 1/2009 | Paulussen et al. | |
| 2010/0233458 | A1 * | 9/2010 | Sun | D01F 8/14 428/401 |
| 2011/0200591 | A1 | 8/2011 | Bisgaard-Frantzen | |

FOREIGN PATENT DOCUMENTS

| | | | |
|---|---|---|---|
| CN | 106700108 | A | 5/2017 |
| CN | 109161043 | A | 1/2019 |
| CN | 110105612 | A | 8/2019 |
| CN | 110746630 | A | 2/2020 |
| JP | 2007529614 | A | 10/2007 |
| JP | 2008517143 | A | 5/2008 |
| JP | 2014523962 | A | 9/2014 |

OTHER PUBLICATIONS

Kato et al., Biotechnology and Bioengineering, 47(5), 1995, 557-566.*
Vasilev et al., Plasma Porcess and Polymers, 2011, 8, 1010-1023.*
Chinese Patent Application No. 202180014948.0, Office Action dated Oct. 29, 2024—English Translation Available.
Japanese Patent Application No. 2022-552193, Office Action dated Nov. 25, 2024—English Translation Available.
Abbas et al., “IGY Antibodies for the Immunoprophylaxis and Therapy of Respiratory Infections,” Human Vaccines & Immunotherapeutics, 2019, vol. 15 (1), pp. 1-12.
Boziaris et al., “Specific Spoilage Organisms (SSOS) in Fish, ”The Microbiological Quality of Food, 2017, pp. 61-98.
Ehsani et al., “Extraction of Specific Egg Yolk Antibodies and Application in Chitosan Coating: Effect on Microbial and Sensory Properties of Rainbow Trout Fillet During Chilled Storage,” Journal of the Science of Food and Agriculture, Feb. 2019, vol. 99, pp. 2356-2364.
Hu et al., “The Preparation and Antibacterial Effect of Egg Yolk Immunoglobulin (IGY) Against the Outer Membrane Proteins of Vibrio Parahaemolyticus,” Journal of the Science of Food and Agriculture, 2019, vol. 99 (5), pp. 2565-2571.

(Continued)

*Primary Examiner* — Kyle A Purdy
(74) *Attorney, Agent, or Firm* — Borden Ladner Gervais LLP

(57) ABSTRACT

The present disclosure relates to anti-microbial film, and more particularly to anti-microbial film for packaging of a perishable item. According to an aspect, the present disclosure is directed to a packaging film comprising a polymer film having a surface, and an antimicrobial agent chemically linked to the surface. According to an aspect, the present disclosure is directed to a method of preparing a packaging film, the method comprising: (a) providing a polymer film having a surface; (b) modifying the surface by UV, plasma or corona treatment; and (c) chemically linking an antimicrobial agent to the modified surface. In an embodiment, the packaging film may be used in packaging for a perishable item.

19 Claims, 6 Drawing Sheets

(56) References Cited

OTHER PUBLICATIONS

International Patent Application No. PCT/CA2021/050247, International Preliminary Report on Patentability dated Aug. 30, 2022.
International Patent Application No. PCT/CA2021/050247, International Search Report and Written Opinion dated Apr. 9, 2021.
Kollberg et al., "Avian Antibodies (IGY) to Fight Antibiotic Resistance," Clinical Microbiology: Open Access, 2015, vol. 4 (2), pp. 1-5.
Lee et al., "In Vitro Studies of Chicken Egg Yolk Antibody (Igy) Against *Salmonella enteritidis* and *Salmonella typhimurium*," Poultry Science, 2002, vol. 81 (5), pp. 632-641.
Li et al., "Biodegradable Composites from Polyester and Sugar Beet Pulp with Antimicrobial Coating for Food Packaging," Journal of Applied Polymer Science, Apr. 2012, vol. 126, pp. E361-E372.
Nychas et al., "Meat Spoilage During Distribution," Meat Science, 2008, vol. 78 (1-2), pp. 77-89.
Sui et al., "Antibacterial Activity of Egg Yolk Antibody (IGY) Against Listeria Monocytogenes and Preliminary Evaluation of Its Potential for Food Preservation," Journal of the Science of Food and Agriculture, 2011, vol. 91 (11), pp. 1946-1950.
Wang et al., "Evaluation of the Spoilage Potential of Bacteria Isolated From Chilled Chicken in Vitro and in Situ," Food Microbiology, 2017, vol. 63, pp. 139-146.
Canadian Patent Application No. 3173254, Office Action dated Feb. 13, 2024.
Chinese Patent Application No. 202180014948.0, Office Action dated Feb. 23, 2024—English Translation Available.
European Patent Application No. 21760582.3, Extended European Search Report dated Feb. 5, 2024.
Hatta et al., "Productivity and Some Properties of Egg Yolk Antibody (IgY) against Human Rotavirus Compared with Rabbit IgG," Bioscience, Biotechnology, and Biochemistry , 1993, vol. 57(3) pp. 450-454.
Chinese Patent Application No. 202180014948.0, Office Action dated Aug. 15, 2023—English Translation Available.
Japanese Patent Application No. 2022552193, Notice of Reasons for Refusal dated Jun. 9, 2025—English Translation Available.
Japanese Patent Application No. 2022552193, the Certificate for the Japanese Patent No. 7791829 dated Dec. 16, 2025.

* cited by examiner

Only PBAT film (control)

PBAT+ Plasma (control)

PBAT+System

COMPOSTABLE ANTI-MICROBIAL FILM AND METHOD OF APPLYING FILM TO PACKAGING

FIELD

The present disclosure relates to antimicrobial film, and more particularly to antimicrobial film for packaging of a perishable item.

BACKGROUND

Packaging films are crucial tools in prolonging the shelf life of perishable items, including food, and medicine, by inhibiting microbial growth. Packaging films may benefit from the synergistic effects of a polymeric substrate together with a thin hydrogel layer containing an antimicrobial agent.

However, such known approaches do not provide the ability to customize antibacterial properties to target specific bacteria in a given packaging film to suit the contents that may be packaged therein. For instance, in view of the increasing incidence of antimicrobial resistance among microorganisms, the suitability of a single-target packaging film may be limited and quickly obsolete.

Additionally, such packaging films may affect the quality of their contents, for example by diffusing antimicrobial agents or antibiotic drugs into the perishable items.

BRIEF DESCRIPTION OF THE DRAWINGS

Embodiments of the present disclosure will now be described, by way of example only, with reference to the attached Figures.

DETAILED DESCRIPTION

Figure 1:
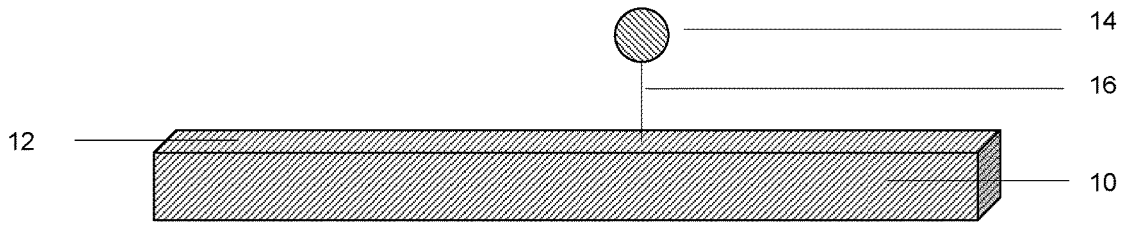
FIG. 1 illustrates a representation of a packaging film according to an embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Embodiments of the present disclosure provide a compostable antimicrobial film and a method of applying film to packaging. The present disclosure relates to antimicrobial film, and more particularly to antimicrobial film for packaging of a perishable item. According to an embodiment, the present disclosure provides a packaging film comprising a polymer film having a surface, and an antimicrobial agent chemically linked to the surface. According to another embodiment, the present disclosure provides a method of preparing a packaging film, the method comprising: (a) providing a polymer film having a surface; (b) modifying the surface by UV, plasma or corona treatment; and (c) chemically linking an antimicrobial agent to the modified surface. In an embodiment, the packaging film may be used in packaging for a perishable item.

Some examples of known packaging films are as follows. KR101417767B1 teaches antibacterial film for food packaging comprising chitosan and an inorganic antibacterial agent and a method for producing the same. CH713367B1 teaches a method for prolonging the refrigerated storage period of peeled conditioned shrimp by keeping it fresh with antibacterial active material in combination with keeping fresh under a modified atmosphere. U.S. Ser. No. 10/494,493B1 teaches biodegradable composite membranes with antimicrobial properties consisting of nanocellulose fibrils, chitosan, and S-Nitroso-N-acetylpenicillamine (SNAP) for food packaging applications. Other examples may be found in WO2018106191A1, CN110105612A, CN110591300A, KR20190119501A, CN110127769, US20060154894A1, WO2019113520, US2012232191, and US20180340049, though this is not an exhaustive list.

In view of the shortcomings in existing antimicrobial packaging technologies, embodiments of the present disclosure seek to produce customizable packaging film to respond to the development of antimicrobial resistance such that a variety of antimicrobial agents may be incorporated, singly or in in combination. This may, for example, increase the suitability of a given packaging film or type of film for an increased number of microbial targets. Additionally, the customization may allow for a targeting of microbes that may be most commonly found in accordance with the package contents.

In an embodiment, an antimicrobial film according to the present disclosure is fabricated by chemically binding a thin hydrogel layer on the surface of a substrate, for example PBAT, in order to impart antimicrobial properties. The mechanism of action of the film is to have an antimicrobial surface that is effective upon contact with a perishable item, and not via antimicrobial agents diffusing from the surface into the food item.

The thin hydrogel layer may be composed of IgY antibodies and chitosan.

IgY against *E. Coli* may be produced by immunizing a chicken with whole deactivated *E. Coli* bacteria, which results in the production of IgY in the egg yolk. Chitosan may be used since it also has antimicrobial properties, but also provides the matrix component of the hydrogel that anchors IgY to the PBAT surface and swells upon contact with, for example, the surface of the fish fillet.

Using IgY antibodies may allow customization of antimicrobial properties to target specific microbes, for example, bacteria. This ability to specifically target bacteria, and the ability to customize a formulation depending on the most detrimental microbe for a given perishable item may enhance shelf life of that item.

Unlike broad-range antimicrobial agents, IgY may be produced to target resistant bacteria that can build resistance to widely used antibacterial agents. The experiments herein were done using IgY produced against *E. Coli*. However, IgY against other microbes, such as the 3 main spoilage bacteria in fresh salmon, is also possible.

FIG. 1 illustrates a representation of a packaging film according to an embodiment of the present disclosure. The packaging film according to embodiments of the present disclosure comprises a polymer film having a surface, and an antimicrobial agent chemically linked to the surface. FIG. 1 shows an embodiment of a packaging film (10) having a surface (12), and an antimicrobial agent (14) linked to the surface via the chemical link (16). The packaging film may further comprise a hydrogel layer disposed on the surface, and the hydrogel layer may comprise the antimicrobial agent. In an embodiment, the hydrogel layer is the antimicrobial agent. In another embodiment, the hydrogel layer is linked to the antimicrobial agent.

Figure 2:
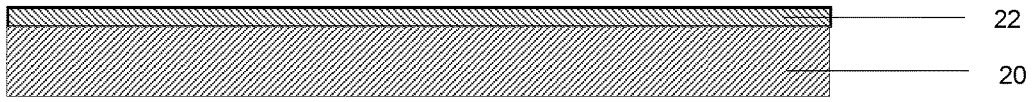
FIG. 2 illustrates a cross-sectional view of a packaging film according to an embodiment of the present disclosure.

FIG. 2 illustrates a cross-sectional view of a packaging film according to an embodiment of the present disclosure. The embodiment of FIG. 2 shows a packaging film (20) with hydrogel layer (22) disposed on the surface, wherein the hydrogel layer (22) comprises an antimicrobial agent.

The antimicrobial agent may be any suitable agent for inhibiting microbial growth. The antimicrobial agent may be an antimicrobial compound, peptide, protein, enzyme, polymer, or essential oil. The antimicrobial agent may be a bacteriocin. The antimicrobial agent may be an antibody. The antimicrobial agent may be an immunoglobulin. The antimicrobial agent may be immunoglobulin Y (IgY). The antimicrobial agent may be a polysaccharide. The antimicrobial agent may be chitosan. The antimicrobial agent IgY and chitosan. IgY and chitosan may be each, independently of one another, linked to the surface. IgY may be linked to chitosan, and chitosan linked to the surface. Chitosan may be linked to IgY, and IgY linked to the surface. Chitosan may form the hydrogel layer, but may also be considered an antimicrobial agent. The antimicrobial agent may comprise two or more components. The antimicrobial agent may comprise two or more components linked, independently of one another, to the surface. The antimicrobial agent may comprise two or more components, wherein a first component is linked to the surface and a second component is linked to the first component. The components may be linked directly, or through an additional linker. Two or more components may be linked sequentially.

The antimicrobial agent may be immunoglobulin Y (IgY). IgY may be an IgY against a bacterium, virus, or fungi. IgY may be an IgY against a virus, such as Sars-Cov-2. IgY may be an IgY against a bacterium, such as a spoilage or contamination bacterium. IgY may be an IgY against a bacterium selected from the group consisting of *Escherichia coli, Shewanella putrefaciens, Pseudomonas Fluorescens, Photobacterium phosphoreum, Listeria monocytogenes*, Lactic Acid Bacteria, and *Clostridium Botulinum*. IgY may be an IgY against *Escherichia coli* (*E. coli*). IgY may be an IgY against a virus, such as of the SARS-associated coronavirus such as SARS-CoV and SARS-CoV-2, influenza A and B, such as type A H1N1, H3N2 or type B victoria and yamagata. IgY may be isolated from a chicken egg yolk. IgY against *E. coli* may be isolated from a chicken egg yolk produced in a chicken that was immunized with whole deactivated *E. coli* bacteria. The IgY may be produced by any other suitable manner, such as those well known in the art (see, for example, Refs [1-4]).

The terms chemically linked, covalently linked, and cross-linked may be used interchangeably. Chemically linked may include any means of linking the antimicrobial agent to the surface, such as by covalent bond formation. For example, the antimicrobial agent may be covalently linked to a hydrogel by an amide bond. The hydrogel may be chemically linked to a film surface. The hydrogel itself may be an antimicrobial agent. The hydrogel may be a weak antimicrobial agent. The hydrogel may not be an antimicrobial agent, but linked to an antimicrobial agent.

The hydrogel layer may comprise one or more polymers. The hydrogel layer may be a natural, naturally-derived, or synthetic polymer. The hydrogel layer may be selected from dextran, cellulose and its derivatives, (e.g. carboxymethyl cellulose, hydroxyethyl cellulose, hydroxypropyl cellulose, methyl cellulose hydroxypropyl methylcellulose, cellulose acetate phthalate), hyaluronic acid, chitosan, gelatin, starch, pectin, alginate, polyacrylamide, poly acrylic acid, poly methyl methacrylate, poly lactic acid, polyvinylpyrrolidone, poly 2-hydroxyethyl methacrylate and combinations thereof.

Figure 3:
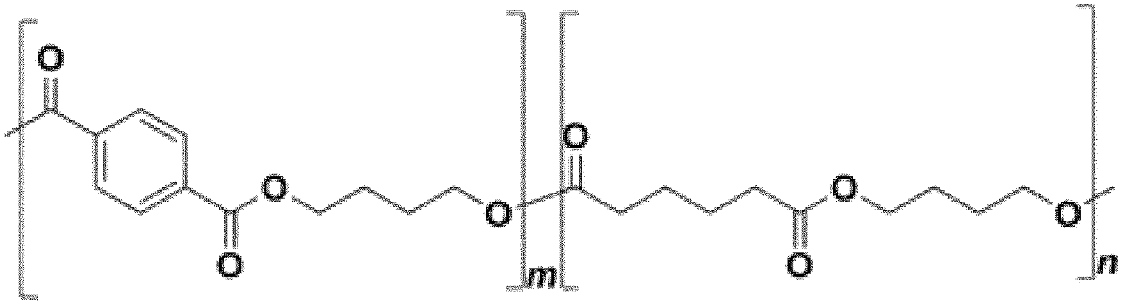
FIG. 3 is the molecular structure of polybutylene adipate terephthalate (PBAT).

FIG. 3 shows the chemical structure of PBAT. In an embodiment, the polymer film may be polybutylene adipate terephthalate (PBAT). The polymer film may be compostable or bio-degradable.

The polymer film may comprise one or more polymers. The polymer film may be a compostable or biodegradable polymer. The polymer film may be polybutylene adipate terephthalate (PBAT), polylactic acid, a polyhydroxyalkanoate, polybutylene succinate, a cellulose-based material, polyglycolic acid, polycaprolactone, polyvinyl alcohol, a carbohydrate-based material, a protein-based material, or combinations thereof. The polymer film maybe a non-biodegradable polymer. The polymer film may be polyethylene, polypropylene, polyvinyl chloride, polyethylene terephthalate, polystyrene, or combinations thereof. The polymer film may comprise polybutylene adipate terephthalate (PBAT), polylactic acid, polyhydroxyalkanoates, polybutylene succinate, cellulose-based materials, polyglycolic acid, polycaprolactone, polyvinyl alcohol, carbohydrate-based materials, protein-based materials, polyethylene, polypropylene, polyvinyl chloride, polyethylene terephthalate, polystyrene, or combinations thereof.

The packaging film according to embodiments of the present disclosure may include other components. The packaging film may specifically exclude other components. The packaging film may be substantially free, or completely free of inorganic components. The packaging film may be free of antibiotic drugs. The term "antibiotic drug" as used herein may be used interchangeably with antibiotic small molecules, and encompasses small molecule antibiotic drugs having various mechanisms of action including targeting the cell wall/cell membrane, or interfering with bacterial enzymes. The term "antimicrobial agent" or "antibacterial agent" as used herein includes, for example, IgY, which is a protein that is mainly targeting the surface of the bacteria, and can induce its antibacterial effect via structural alteration of the bacterial surface [5]. The term "substantially free", as used herein, means about 30 wt. % or less. The term "completely free", as used herein, means about 1 wt. % or less.

The packaging film according to embodiments of the present disclosure may be used in any suitable packaging product, such as films, trays, or solid backing.

Figure 4:
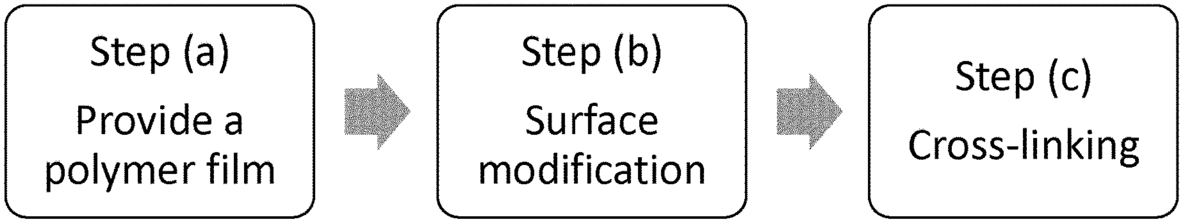
FIG. 4 is a flowchart illustrating a method of producing a packaging film according to an embodiment of the present disclosure.

FIG. 4 is a flowchart illustrating a method of producing a packaging film according to an embodiment of the present disclosure. In an embodiment, the method includes the steps of (a) providing a polymer film having a surface; (b) modifying the surface by UV, plasma or corona treatment; and (c) chemically linking an antimicrobial agent to the modified surface. The method may include forming a polymer into the polymer film, prior to step (a).

The method may include extruding a polymer resin into the polymer film by film blowing or film casting. It will be understood that any other suitable means of forming a polymer film may be used, without departing from the scope of the present disclosure. The polymer film may be formed from polybutylene adipate terephthalate (PBAT), polylactic acid, a polyhydroxyalkanoate, polybutylene succinate, a cellulose-based material, polyglycolic acid, polycaprolactone, polyvinyl alcohol, a carbohydrate-based material, a protein-based material, polyethylene, polypropylene, polyvinyl chloride, polyethylene terephthalate, polystyrene, or combinations thereof. The polymer film may be formed from PBAT.

The polymer film may have a thickness of about 10 μm to about 500 μm. The polymer film may have a thickness of about 80 μm. The polymer film may have a thickness of about 10 μm, about 20 μm, about 30 μm, about 40 μm, about 50 μm, about 60 μm, about 70 μm, about 75 μm, about 80 μm, about 85 μm, about 90 μm, about 100 μm, about 200 μm, about 300 μm, about 400 μm, or about 500 μm. The polymer film may have a thickness of about 20 to about 100 μm, about 30 to about 100 μm, about 40 to about 100 μm, about 50 to about 100 μm, about 60 to about 100 μm, about 70 to about 100 μm, about 80 to about 100 μm, about 90 to about 100 μm, about 100 to about 200 μm, about 200 to about 300 μm, about 300 to about 400 μm, about 400 to about 500 μm, about 250 to about 500 μm, about 100 to about 500 μm, about 70 to about 90 μm, about 80 to about 90 μm, about 70 to about 80 μm, about 75 to about 85 μm, or about 79 to about 81 μm.

The step of modifying the surface of the polymer film by UV, plasma or corona treatment ("step (b)", or "the modifying step") may be carried out by any suitable procedure or method. Treatment with UV light of a suitable wavelength may be used to modify the surface. For example, the modifying step may be done in the presence of UV light of from about 100 to about 400 nm, or about 254 nm and with a power of 1-500,000 milli Watts, or about 15 mW and with an exposure time at about 1-216,000 seconds, or about 60 s. For example, arc discharge, corona discharge, or dielectric barrier discharge may be used. Additionally, atmospheric plasma may be used. The modifying step may be done in a plasma chamber in the presence of oxygen. The modifying step may be done in the plasma chamber at about 5 to about 1000 Watts. The modifying step may be done at about 200 Watts. The modifying step may be done at about 5, about 10, about 20, about 50, about 100, about 150, about 200, about 250, about 300, about 350, about 400, about 450, about 500, about 600, about 700, about 800, about 900, or about 1000 Watts. The modifying step may be done at about 150 to about 250 Watts, about 150 to about 200 Watts, about 200 to about 250 Watts, about 100 to about 300 Watts, about 100 to about 400 Watts, about 100 to about 500 Watts, about 100 to about 1000 Watts, about 500 to about 1000 Watts, about 750 to about 1000 Watts, or about 50 to about 500 Watts. The modifying step may be done at any suitable pressure, such as about 250 mTorr to about 760 mTorr. The modifying step may be done at atmospheric pressure. The modifying step may be done for any suitable amount of time to achieve surface modification of the polymer film. The modifying step may be done for milliseconds to minutes. The modifying step may be done for about 100 milliseconds to about 10 minutes. The modifying step may be done for about 3 minutes. The modifying step may be done for about 1 minute, about 2 minutes, about 4 minutes, or about 5 minutes. The modifying step may be done for less than 1 minute. The modifying step may be done for more than 5 minutes.

The modifying step may include treating the surface with a solution after the UV, plasma or corona treatment. The solution may be any suitable solution to facilitate the surface modification of the polymer film. The solution may comprise a carboxylic acid. Herein, the term "carboxylic acid" may refer to any molecule containing a carboxylic acid or a reactive carboxyl chemical group. For example, the carboxylic acid may be formic acid, acetic acid, propionic acid, butyric acid, valeric acid, caproic acid, enantic acid, caprylic acid, pelargonic acid, capric acid, fumaric acid, malic acid, acrylic acid, citric acid, gluconic acid, itaconic acid, adipic acid, oxalic acid, malonic acid, succinic acid, glutaric acid, pimelic acid, suberic acid, azelaic acid, sebacic acid, keto acids, aspartic acid, glutamic acid, sodium acetate, potassium acetate, ammonium acetate, or vinyl acetate, or combinations thereof. The carboxylic acid may be acetic acid, citric acid, or acrylic acid. The solution may be about 25% acetic acid to about 99% acetic acid in water. The solution may be about 25%, about 30%, about 40%, about 50%, about 60%, about 70%, about 80%, about 90%, about 95%, or about 99% acetic acid in water, or in any suitable solvent. The solution may be glacial acetic acid, or about 100% acetic acid. The modifying step may include washing the surface with water after treating the surface with the solution. The modifying step may include washing the surface with any suitable solvent after treating the surface with the solution.

The step of chemically linking an antimicrobial agent to the modified surface ("step (c)", or "the linking step") may be carried out by any suitable procedure or method. Chemically linking may include covalent linking, crosslinking, or any means of linking the antimicrobial agent to the surface. The antimicrobial agent may be linked to the surface covalently by an amide bond. The linking step may include crosslinking the antimicrobial agent to the modified surface in the presence of a crosslinking reagent. The crosslinking reagent may be 1-(3-dimethylaminopropyl)-3-ethylcarbodiimidehydrochloride (EDC) and N-hydroxysuccinimide (NHS). The linking step may include treating the modified surface with the antimicrobial agent, EDC, and NHS, in an aqueous solution. The linking step may include treating the modified surface with chitosan, IgY, EDC, and NHS, in an aqueous solution. The linking step may include treating the modified surface with chitosan, IgY, EDC, and NHS, to form a film with a chitosan hydrogel layer disposed on the surface, and to form amide bonds between (i) chitosan and the film, (ii) chitosan and IgY, and/or (iii) IgY and the film. The linking step may be done under any suitable conditions to crosslink the antimicrobial agent and the modified surface. The linking step may be done at about 20 to about 60° C., such as at about 40° C. The linking step may be done at about room temperature to about 65° C. The linking step may be done for about 100 milliseconds to about 1 hour. The linking step may be done for about 15 minutes, about 30 minutes, about 45 minutes, or about 1 hour. The linking step may be done for more than about 1 hour. The linking step may be done for less than about 15 minutes. The linking step may be done for less than 1 minute, such as less than 1 second.

The method of producing a packaging film may include washing the film to remove unreacted crosslinking reagent and/or unbound antimicrobial agent. The washing may be done with water or any other suitable solvent.

The packaging film as described herein may be used for any suitable purpose. The packaging film may be used in packaging for a perishable item or an associated device. The perishable item may be food, chemicals, pharmaceuticals, plants, and animal products. The perishable item may be a food item. The food item may be meat, poultry, pork, fruits, vegetables, or seafood. The food item may be fish, such as salmon, branzino, tilapia, halibut, cod, sole, perch, walleye, catfish, tuna, yellowtail, kampachi, snapper, swordfish, grouper, trout, bluefish, mackerel, sardines, anchovies, or herring. The food item may be a whole fish, or a fish portion such as a fish fillet. The packaging may be entirely composed of the packaging film, or the packaging film may be only one component of the packaging. The surface of the film may be configured to be in contact with a surface of the perishable item. The hydrogel layer of the film may be configured to be in contact with a surface of the perishable item. The antimicrobial agent may remain substantially bound to the film and may not diffuse into the perishable food item. The packaging may inhibit microbial growth on the perishable item. The packaging may inhibit bacterial growth on the perishable item. The packaging may inhibit bacterial growth on the perishable item up to 10,000 fold (i.e. 4-log) relative to a control of PBAT film with no antimicrobial surface. The packaging, or a portion of the packaging, may be compostable or bio-degradable. The packaging may be used in a medical application, such as wound care. The packaging may be used in cannabis-related packaging, such as the packaging of cannabis plants or products. This packaging may be used in other applications, for example, meal kits, filtration membranes, water treatment, and textiles.

The packaging film as described herein may be customizable to target specific bacteria. The packaging film may have the ability to target bacteria that have developed resistance to other antimicrobial agents. The customizability of the film may allow the film to be used in the packaging of various products.

Example 1

Figure 5:
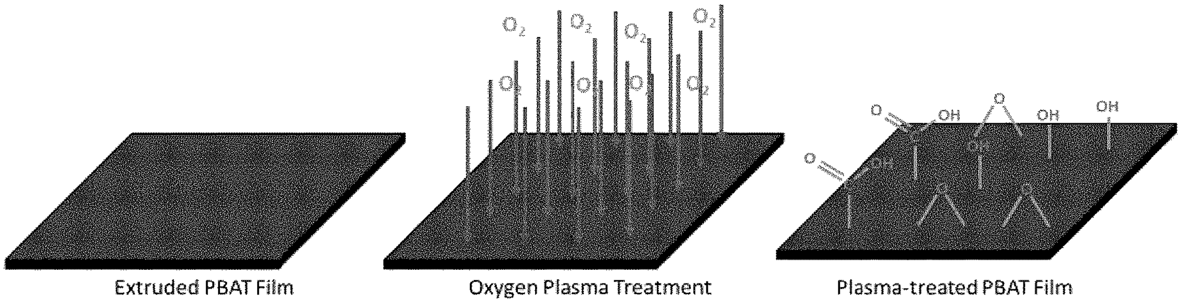
FIG. 5 is a schematic diagram of the oxygen plasma treatment of a polymer film to create functional groups on the surface of the film.

Polybutylene adipate terephthalate (PBAT) is a polymer with the chemical structure shown in FIG. 3. Plasma $O_2$ treatment of the polymer film can be carried out as shown in FIG. 5. FIG. 5 is a schematic diagram of the oxygen plasma treatment of a polymer film to create functional groups on the surface of the film. The functional groups formed on the surface of a PBAT film after oxygen plasma treatment may include carboxyl groups, alcohols, and epoxides. Carboxyl groups can then be crosslinked to an amine using EDC/NHS crosslinkers. For example, ethanolamine can be used as a model amine to test the crosslinking reaction. FTIR can then be used to detect the amide bonds formed.

A series of PBAT samples (Samples 1-7) were prepared using PBAT film that was previously produced by extruding PBAT resin into a sheet 80 μm thick. This may be done by, for example film blowing or film casting. The samples (S1-S7) were prepared as follows:

Sample 1 (S1). PBAT Film

S1 was prepared as follows: PBAT film was washed with water. No other treatment of modifications were applied.

Sample 2 (S2). PBAT+ Acetic Acid (AA)

S2 was prepared as follows: PBAT film was placed in glacial acetic acid for 5 minutes and was washed 3 times with water.

Sample 3 (S3). PBAT+EDC+NHS+ETH Amine

S3 was prepared as follows: PBAT film was immersed in a solution of EDC, NHS, and ethanolamine for 1 hour. It was then washed three times with water.

Sample 4 (S4). Plasma $O_2$ 180 s at High Power PBAT+EDC+NHS+ETH Amine (P-H-EDC)

S4 was prepared as follows: PBAT film was placed in a plasma chamber at 400 Watts and 250 mTorr for 3 minutes. It was then immersed in a solution of EDC, NHS, and ethanolamine for 1 hour. The film was then washed three times with water.

Sample 5 (S5). Plasma $O_2$ 180 Sat Medium Power PBAT+EDC+NHS+ETH Amine (P-M-EDC)

S5 was prepared in accordance with the methods of S4 using medium power (200 W) instead of high power (400 W).

Sample 6 (S6). Plasma $O_2$ 180 s at High Power Immerse in AA then PBAT+EDC+NHS+ETH Amine (P-H-AA-EDC)

S6 was prepared as follows: PBAT film was placed in a plasma chamber at 400 Watts and 250 mTorr for 3 minutes. It was then immersed in glacial acetic acid solution for 5 minutes. The film was then washed 3 times with water, and then placed in a solution of EDC, NHS, and ethanolamine for 1 hour. The film was then washed three times with water.

Sample 7 (S7). Plasma $O_2$ 180 s at Medium Power Immerse in AA then PBAT+EDC+NHS+ETH Amine (P-M-AA-EDC)

S7 was prepared in accordance with the methods of S6 using medium power (200 W) instead of high power (400 W).

Samples S1-S7 were placed in vacuum oven 4 h prior to analysis. The samples were measured with a Bruker Alpha II instrument with a diamond crystal. Spectra were taken from 4000 to 200 $cm^{-1}$. Resolution was 4 $cm^{-1}$. 32 scans were performed per sample. Background was automatically removed by the software. The expected peaks for secondary amides are a strong peak (1700-1650 $cm^{-1}$), a medium peak (1580-1500 $cm^{-1}$), and a medium peak (3400-3100 $cm^{-1}$).

Figure 6:
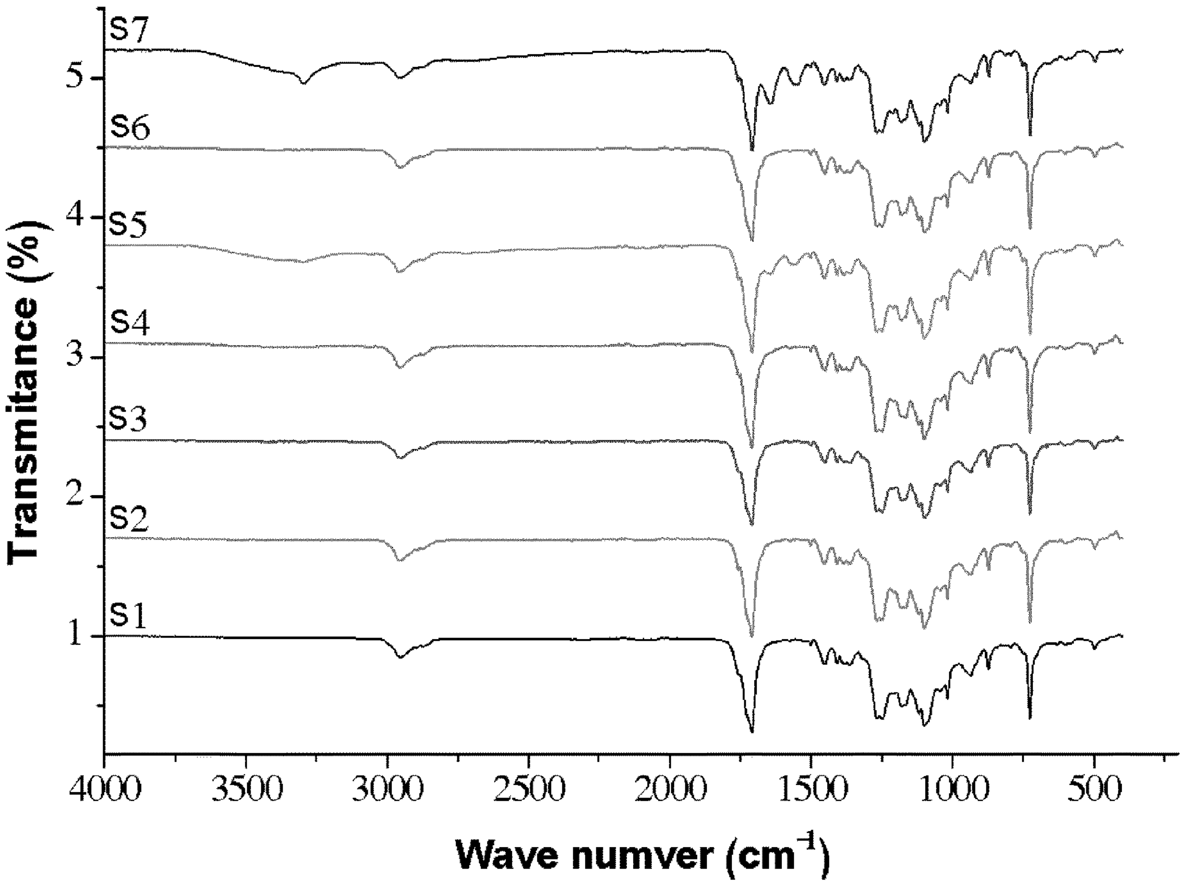
FIG. 6 shows transmittance percentage over wave number ($cm^{-1}$) in a PBAT Attenuated Total Reflectance—(ATR) FTIR analysis in of samples S1-S7 in Example 1.

FIG. 6 shows the ATR-FTIR analysis of samples S1-S7. For example, FIG. 6 shows transmittance percentage over wave number ($cm^{-1}$) in a PBAT Attenuated Total Reflectance—(ATR) FTIR analysis for samples S1-S7. According to FIG. 6, S7 shows the most amide bond formation on the surface, for example, by the presence of peaks at 1560 $cm^{-1}$, 1645 $cm^{-1}$, and 3295 $cm^{-1}$.

Figure 7:
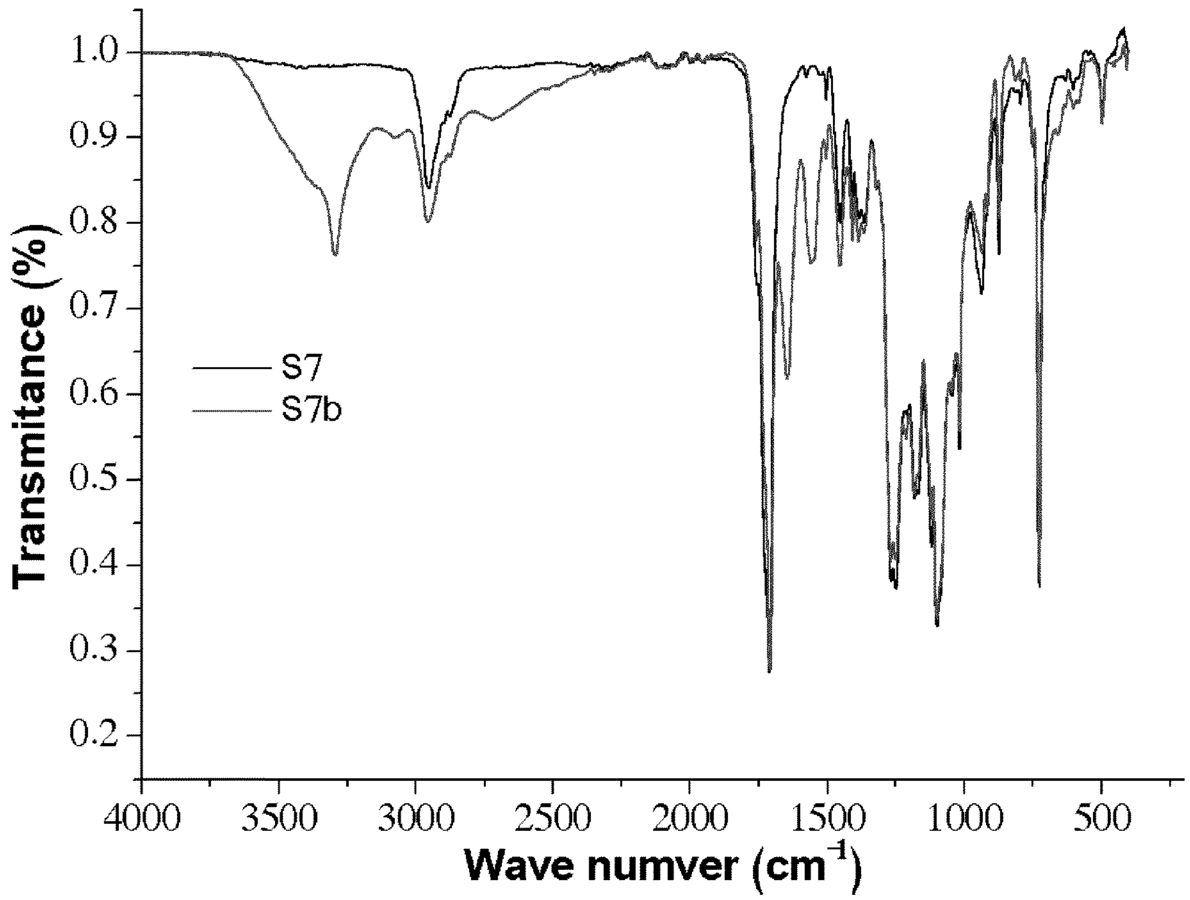
FIG. 7 shows transmittance percentage over wave number ($cm^{-1}$) in a PBAT ATR-FTIR in sample S7 and sample S7b of Example 1.

FIG. 7 shows the ATR-FTIR analysis of the treated (front) side of sample S7 (S7) and the back-side of the film of sample 7 (S7b). According to FIG. 7, amide bonds were formed only on the surface that was exposed to plasma.

Example 2

PBAT film is produced by extruding PBAT resin into a sheet 80 μm thick. This may be done by, for example film blowing or film casting.

The sheet is then cut into the desired sized film samples for experimental or commercial purposes. For example, the sheet may be cut into 1 cm by 1 cm squares.

A notch may be cut or other identification means may be applied to indicate the active surface of the film.

The activation solution is then prepared as follows.

First, 100 mL of a 2.5 mg/mL chitosan solution is prepared in a 0.06 M HCl (stock solution). For experimental purposes, the pH of the desired volume of chitosan solution may be adjusted by dropwise addition of 1 M sodium hydroxide.

Second, a 1-(3-Dimethylaminopropyl)-3-ethylcarbodiimidehydrochloride (EDC) solution is prepared from a stock solution of 20 mg/mL EDC in distilled water.

Third, an N-Hydroxysuccinimide (NHS) solution is prepared from a stock solution of 20 mg/ml NHS in distilled water.

Fourth, an IgY antibody solution is prepared from a 21.5 mg/mL IgY stock solution in Phosphate Buffered Solution. The IgY antibody used in this protocol was prepared by Exalpha Biologics specifically against *E. Coli*.

The antibacterial PBAT film is then prepared as follows.

The PBAT sample films are placed in a plasma chamber and treated with oxygen at 200 W at 250 mTorr for 3 minutes. The top surface exposed to plasma is considered the treated surface (i.e. active surface or anti-microbial surface), while the bottom surface is not.

Immediately after the plasma treatment, the film samples are immersed in 99% acetic acid for 5 minutes.

The film samples are then washed with distilled water three to four times.

To functionalize the film to render an antibacterial surface, two film samples are placed in a 2 mL low-bind Eppendorf tube. To the Eppendorf tube is added 1.6 mL of 2.5 mg/mL chitosan solution and 18 μl of 0.2 mg/mL IgY solution. Then, 0.2 mL each of freshly prepared EDC and NHS solution are added to the Eppendorf tube to a final concentration of 2 mg/mL each. The film samples are then left to allow the crosslinking reaction to take place for an hour.

The film samples are then washed thoroughly three to four times for ten minutes each with water to ensure the complete removal of unreacted EDC, NHS and any chitosan and IgY unbound to the film sample.

The film samples are then dried at room temperature for 15 minutes and stored in a petri dish until needed.

Prior to use, the film samples are washed three to four times for 10 minutes with water.

Example 3

Effect of Compostable Active Films on *E. coli* Treated Salmon at Room Temperature (RT) after 24 Hours Objectives:

1. Grafting Chitosan/IgY on PBAT film
2. In situ tests of developed films on salmon fish inoculated with *E. coli*

Methods:

3 types of samples were prepared:

1. PBAT film (Control): a PBAT film was prepared according to the method of Example 1, sample 1.
2. PBAT film treated with plasma (PBAT+Plasma): a PBAT film was prepared by placing the PBAT film in a plasma chamber and treating with oxygen at 200 W at 250 mTorr for 3 minutes.
3. PBAT film grafted with Chitosan and IgY (PBAT+System): a PBAT film was crosslinked with chitosan and IgY according to the method of Example 2.

In order to test the specific antibacterial effect of the film against *E. Coli*, other bacteria on the fish were first removed through sterilization with a 2.5% chlorine solution (Calcium Hypochrolite 70% $Ca(ClO)_2$). Fish samples were then washed three times with water prior to inoculation with *E. Coli*.

A quantity of 10 μL of 105-106 CFU/ml pre-cultured *E. coli* was inoculated onto 0.3 g salmon fish samples. The fish samples were placed in petri dishes covered with one of the three types of PBAT film samples (2 pieces—one on top and one on the bottom of the fish sample, 1.5 $cm^2$).

Figure 8:
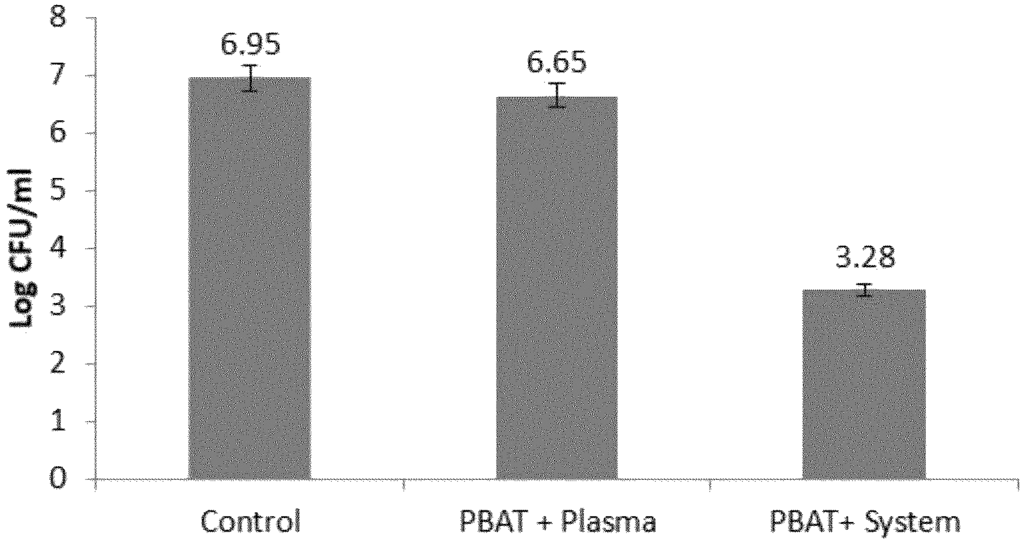
FIG. 8 shows the antimicrobial effect of functionalized PBAT films against *E. coli* treated on salmon fish after 24 hr at room temperature.

Results:

FIG. 8 shows the antibacterial effect of functionalized PBAT films against *E. coli* treated on salmon fish after 24 hr at room temperature.

Figure 9:
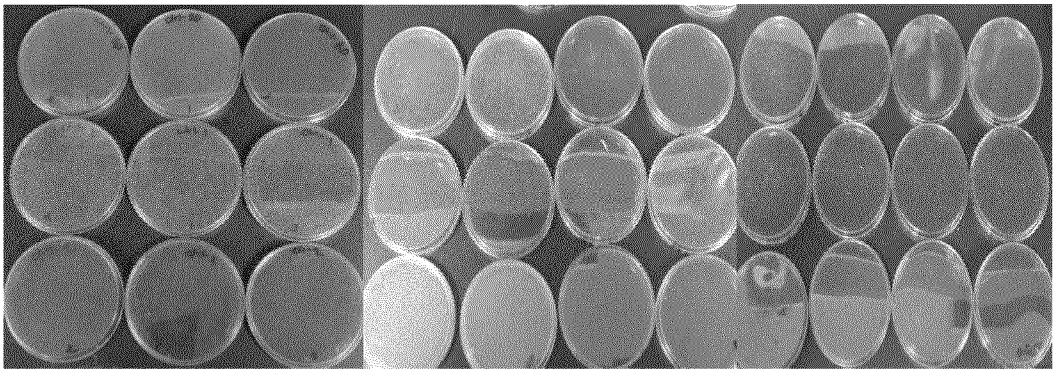
FIG. 9 shows photographic images of agar plates of different samples after microbiological analysis showing visual differences between controls and plasma treated film system.

FIG. 9 shows photographic images of agar plates of different samples after microbiological analysis showing visual differences between controls and plasma treated film system.

The *E. coli* growth of control samples reached 6.95 log colony-forming units per milliliter (CFU/mL) after 24 hr of incubation period at room temperature (RT).

For the samples incubated with plasma-treated PBAT films, the bacterial growth was 6.65 log CFU/mL.

For the samples treated with functionalized (i.e. active) films, the growth was 3.28 log CFU/mL, representing a reduction of approximately 3.3 log CFU/mL after 24 hours of incubation, as compared to control samples.

Results from this experiment demonstrate the significant anti-bacterial effect of the active PBAT film against *E. Coli*. Similarly, this platform technology can include IgY produced against specific spoilage organisms (SSO) involved in spoilage of various fresh foods in order to extend shelf life [6-8]. The ability to customize the active film also allows for targeting resistant bacteria and allows for a broad range protection (i.e. using an antigen common to all gram-negative bacteria to immunize the chicken) or highly specific targeting (i.e. an antigen specific to one bacterial species).

In the preceding description, for purposes of explanation, numerous details are set forth in order to provide a thorough understanding of the embodiments. However, it will be apparent to one skilled in the art that these specific details are not required.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods described herein are not meant to be limiting. Methods comprising different steps, different number of steps, and/or different ordering of steps are also contemplated.

The above-described embodiments are intended to be examples only. Alterations, modifications and variations can be effected to the particular embodiments by those of skill in the art without departing from the scope, which is defined solely by the claims appended hereto. Further numbered embodiments are outlined below.

EMBODIMENTS

Embodiment 1. A packaging film comprising:

a polymer film having a surface; and an antimicrobial agent chemically linked to the surface.

Embodiment 2. The film according to embodiment 1, further comprising a hydrogel layer disposed on the surface, wherein the hydrogel layer comprises the antimicrobial agent.

Embodiment 3. The film according to embodiment 2, wherein the hydrogel layer comprises a natural, naturally-derived, or synthetic polymer.

Embodiment 4. The film according to embodiment 3, wherein the hydrogel layer comprises a polymer selected from the group consisting of dextran, cellulose, cellulose derivatives (e.g. carboxymethyl cellulose, hydroxyethyl cellulose, hydroxypropyl cellulose, methyl cellulose hydroxypropyl methylcellulose, cellulose acetate phthalate), hyaluronic acid, chitosan, gelatin, starch, pectin, alginate, polyacrylamide, poly acrylic acid, poly methyl methacrylate, poly lactic acid, polyvinylpyrrolidone, poly 2-hydroxyethyl methacrylate and combinations thereof.

Embodiment 5. The film according to any one of embodiments 1 to 4, wherein the antimicrobial agent is selected from the group consisting of antimicrobial compounds, antimicrobial peptides, antimicrobial proteins, antimicrobial enzymes, antimicrobial polymers, and antimicrobial essential oils.

Embodiment 6. The film according to any one of embodiments 1 to 5, wherein the antimicrobial agent is selected from the group consisting of immunoglobulin Y (IgY), chitosan, and combinations thereof.

Embodiment 7. The film according to any one of embodiments 1 to 6, wherein the antimicrobial agent comprises immunoglobulin Y (IgY).

Embodiment 8. The film according to any one of embodiments 1 to 7, wherein the antimicrobial agent comprises immunoglobulin Y (IgY) and chitosan.

Embodiment 9. The film according to embodiment 8, wherein IgY and chitosan are each, independently of one another, linked to the surface.

Embodiment 10. The film according to embodiment 8, wherein IgY is linked to chitosan, and chitosan is linked to the surface.

Embodiment 11. The film according to embodiment 8, wherein chitosan is linked to IgY, and IgY is linked to the surface.

Embodiment 12. The film according to any one of embodiments 7 to 11, wherein IgY is an IgY against a bacterium, virus, or fungus.

Embodiment 13. The film according to embodiment 12, wherein the virus is selected from the group consisting of SARS-associated coronavirus, SARS-CoV, SARS-CoV-2, influenza A, influenza type A H1N1, influenza type A H3N2, influenza type B victoria, and 20 influenza type B yamagata.

Embodiment 14. The film according to embodiment 12, wherein the bacterium is a spoilage or contamination bacterium.

Embodiment 15. The film according to embodiment 14, wherein the spoilage bacterium is selected from the group consisting of *Escherichia coli, Shewanella putrefaciens, Pseudomonas Fluorescens, Photobacterium phosphoreum, Listeria monocytogenes*, Lactic Acid Bacteria, and *Clostridium Botulinum.*

Embodiment 16. The film according to embodiment 15, wherein the spoilage bacterium is *E. coli.*

Embodiment 17. The film according to embodiment 16, wherein the IgY against *E. coli* is isolated from a chicken egg yolk produced in a chicken that was immunized with whole deactivated *E. coli* bacteria.

Embodiment 18. The film according to any one of embodiments 1 to 17, wherein the antimicrobial agent is chemically linked to the surface by a covalent bond.

Embodiment 19. The film according to embodiment 18, wherein the antimicrobial agent is chemically linked to the surface by an amide bond.

Embodiment 20. The film according to any one of embodiments 1 to 19, wherein the polymer film comprises a polymer selected from the group consisting of polybutylene adipate terephthalate (PBAT), polylactic acid, polyhydroxyalkanoates, polybutylene succinate, cellulose-based materials, polyglycolic acid, polycaprolactone, polyvinyl alcohol, carbohydrate-based materials, protein-based materials, polyethylene, polypropylene, polyvinyl chloride, polyethylene terephthalate, polystyrene, and combinations thereof.

Embodiment 21. The film according to embodiment 20, wherein the polymer is PBAT.

Embodiment 22. The film according to any one of embodiments 1 to 21, wherein the film is substantially free of inorganic components.

Embodiment 23. The film according to any one of embodiments 1 to 21, wherein the film is completely free of inorganic components.

Embodiment 24. The film according to any one of embodiments 1 to 23, wherein the film is completely free of antibiotic drugs.

Embodiment 25. The film according to any one of embodiments 1 to 24, wherein the film is compostable.

Embodiment 26. The film according to any one of embodiments 1 to 25, wherein the film is for use in a packaging product selected from the group consisting of films, trays, and solid backing.

Embodiment 27. A method of preparing a packaging film, the method comprising:

(a) providing a polymer film having a surface;

(b) modifying the surface by UV, plasma or corona treatment; and (c) chemically linking an antimicrobial agent to the modified surface.

Embodiment 28. The method according to embodiment 27, wherein (c) further comprises chemically linking a hydrogel layer to the modified surface.

Embodiment 29. The method according to embodiment 27, further comprising forming a polymer into the polymer film, prior to step (a).

Embodiment 30. The method according to embodiment 29, wherein forming the polymer into the polymer film comprises extruding a polymer resin into the polymer film by film blowing or film casting.

Embodiment 31. The method according to any one of embodiments 27 to 30, wherein the polymer is selected from the group consisting of polybutylene adipate terephthalate (PBAT), polylactic acid, polyhydroxyalkanoates, polybutylene succinate, cellulose-based materials, polyglycolic acid, polycaprolactone, polyvinyl alcohol, carbohydrate-based materials, protein-based materials, polyethylene, polypropylene, polyvinyl chloride, polyethylene terephthalate, polystyrene, and combinations thereof.

Embodiment 32. The method according to embodiment 31, wherein the polymer is PBAT.

Embodiment 33. The method according to any one of embodiments 27 to 32, wherein the polymer film has a thickness of about 10 μm to about 500 μm.

Embodiment 34. The method according to any one of embodiments 27 to 32, wherein the polymer film has a thickness of about 80 μm.

Embodiment 35. The method according to any one of embodiments 27 to 34, wherein 30 step (b) comprises treating the surface in a plasma chamber in the presence of oxygen.

Embodiment 36. The method according to embodiment 35, wherein in step (b) the plasma chamber is at about 5 Watts to about 1000 Watts.

Embodiment 37. The method according to embodiment 35 or 36, wherein in step (b) the plasma chamber is at about 250 mTorr to about 760 mTorr.

Embodiment 38. The method according to any one of embodiments 35 to 37, wherein step (b) is done for about 100 milliseconds to about 10 minutes.

Embodiment 39. The method according to any one of embodiments 35 to 38, wherein step (b) further comprises treating the surface with a solution after the UV, plasma or corona treatment.

Embodiment 40. The method according to embodiment 39, wherein the solution comprises a carboxylic acid.

Embodiment 41. The method according to embodiment 40, wherein the carboxylic acid is selected from the group consisting of formic acid, acetic acid, chloroacetic acid, propionic acid, butyric acid, valeric acid, caproic acid, enantic acid, caprylic acid, pelargonic acid, capric acid, fumaric acid, malic acid, acrylic acid, citric acid, gluconic acid, itaconic acid, adipic acid, oxalic acid, malonic acid, succinic acid, glutaric acid, pimelic acid, suberic acid, azelaic acid, sebacic acid, keto acids, aspartic acid, glutamic acid, sodium acetate, potassium acetate, ammonium acetate, vinyl acetate, and combinations thereof.

Embodiment 42. The method according to any one of embodiments 39 to 41, wherein the solution is about 5% acetic acid to about 99% acetic acid in water.

Embodiment 43. The method according to any one of embodiments 39 to 41, wherein the solution is 100% (glacial) acetic acid.

Embodiment 44. The method according to any one of embodiments 39 to 43, wherein step (b) further comprises washing the surface with water after treating the surface with the solution.

Embodiment 45. The method according to any one of embodiments 27 to 44, wherein step (c) comprises crosslinking the antimicrobial agent to the modified surface in the presence of a crosslinking reagent.

Embodiment 46. The method according to embodiment 45, wherein the crosslinking reagent comprises 1-(3-dimethylaminopropyl)-3-ethylcarbodiimidehydrochloride (EDC) and N-hydroxysuccinimide (NHS).

Embodiment 47. The method according to embodiment 46, wherein step (c) comprises treating the modified surface with the antimicrobial agent, EDC, and NHS, in an aqueous solution.

Embodiment 48. The method according to any one of embodiments 45 to 47, wherein step (c) is done at about 20 to about 60° C.

Embodiment 49. The method according to any one of embodiments 45 to 48, wherein step (c) is done for about 100 milliseconds to about 1 hour.

Embodiment 50. The method according to any one of embodiments 45 to 49, further comprising:

(d) washing the film with water to remove unreacted crosslinking reagent and unbound antimicrobial agent.

Embodiment 51. The method according to any one of embodiments 27 to 50, wherein the hydrogel layer comprises a natural, naturally-derived, or synthetic polymer.

Embodiment 52. The method according to embodiment 51, wherein the hydrogel layer comprises a polymer selected from the group consisting of dextran, cellulose, 25 cellulose derivatives (e.g. carboxymethyl cellulose, hydroxyethyl cellulose, hydroxypropyl cellulose, methyl cellulose hydroxypropyl methylcellulose, cellulose acetate phthalate), hyaluronic acid, chitosan, gelatin, starch, pectin, alginate, polyacrylamide, poly acrylic acid, poly methyl methacrylate, poly lactic acid, polyvinylpyrrolidone, poly 2-hydroxyethyl methacrylate and combinations thereof.

Embodiment 53. The method according to any one of embodiments 27 to 50, wherein the antimicrobial agent is selected from the group consisting of antimicrobial compounds, antimicrobial peptides, antimicrobial proteins, antimicrobial enzymes, antimicrobial polymers, and antimicrobial essential oils.

Embodiment 54. The method according to any one of embodiments 27 to 53, wherein the antimicrobial agent is selected from the group consisting of immunoglobulin Y (IgY), chitosan, and combinations thereof.

Embodiment 55. The method according to any one of embodiments 27 to 54, wherein the antimicrobial agent comprises immunoglobulin Y (IgY).

Embodiment 56. The method according to any one of embodiments 27 to 55, wherein the antimicrobial agent comprises immunoglobulin Y (IgY) and chitosan.

Embodiment 57. A packaging film prepared according to the method of any one of embodiments 27 to 56.

Embodiment 58. The packaging film according to embodiment 57, wherein the packaging film is compostable.

Embodiment 59. Use of the film according to any one of embodiments 1 to 25, 57 or 58, in packaging for a perishable item.

Embodiment 60. The use according to embodiment 59, wherein perishable item is selected from the group consisting of food, chemicals, pharmaceuticals, devices, plants, and animal products.

Embodiment 61. The use according to embodiment 59 or 60, wherein the perishable 25 item is a food item.

Embodiment 62. The use according to embodiment 61, wherein the food item is selected from the group consisting of meat, poultry, pork, fruits, vegetables, and seafood.

30 Embodiment 63. The use according to embodiment 62, wherein the food item is meat.

Embodiment 64. The use according to embodiment 62, wherein the food item is fish.

Embodiment 65. The use according to any one of embodiments 59 to 64, wherein the surface of the film is configured to be in contact with a surface of the perishable item.

Embodiment 66. The use according to any one of embodiments 59 to 65, wherein the antimicrobial agent remains substantially bound to the film and does not diffuse into the perishable item.

Embodiment 67. The use according to any one of embodiments 59 to 66, wherein the packaging inhibits microbial growth on the perishable item.

Embodiment 68. The use according to any one of embodiments 59 to 67, wherein the packaging inhibits bacterial growth on the perishable item.

Embodiment 69. The use according to any one of embodiments 59 to 68, wherein the film is compostable.

REFERENCES

1 Abbas, A. T., et al., *IgY antibodies for the immunoprophylaxis and therapy of respiratory infections*. Hum Vaccin Immunother, 2019. 15(1): p. 264-275.

2. Hu, B., et al., *The preparation and antibacterial effect of egg yolk immunoglobulin (IgY) against the outer*

*membrane proteins of Vibrio parahaemolyticus*. J Sci Food Agric, 2019. 99(5): p. 2565-2571.
3. Kollberg, H., *Avian antibodies (IgY) to fight antibiotic resistance*. Clinical Microbiology: Open Access, 2015. 4(2).
4. Sui, J., L. Cao, and H. Lin, *Antibacterial activity of egg yolk antibody (IgY) against Listeria monocytogenes and preliminary evaluation of its potential for food preservation*. J Sci Food Agric, 2011. 91(11): p. 1946-50.
5. Lee, E. N., et al., *In vitro studies of chicken egg yolk antibody (IgY) against Salmonella enteritidis and Salmonella typhimurium*. Poult Sci, 2002. 81(5): p. 632-41.
6. Boziaris, I. S. and F. F. Parlapani, *Specific spoilage organisms (SSOs) in fish, in The microbiological quality of food*. 2017, Elsevier. p. 61-98.
7. Nychas, G. J., et al., *Meat spoilage during distribution*. Meat Sci, 2008. 78(1-2): p. 77-89.
8. Wang, G. Y., et al., *Evaluation of the spoilage potential of bacteria isolated from chilled chicken in vitro and in situ*. Food Microbiol, 2017. 63: p. 139-146.

What is claimed is:

1. A packaging film comprising:

a continuous polymer film having a thickness and having a surface treated by UV, plasma or corona treatment;

an antimicrobial agent chemically linked to the surface; and a hydrogel layer disposed on the surface, the hydrogel layer comprising the antimicrobial agent and a cellulose derivative, the cellulose derivative comprising one or more of: carboxymethyl cellulose, hydroxyethyl cellulose, hydroxypropyl cellulose, methyl cellulose hydroxypropyl methylcellulose, and cellulose acetate phthalate, wherein the thickness of the film is substantially free of the antimicrobial agent, and wherein the packaging film is for packaging a perishable item.

2. The film according to claim 1, wherein the antimicrobial agent is selected from the group consisting of antimicrobial compounds, antimicrobial peptides, antimicrobial proteins, antimicrobial enzymes, antimicrobial polymers, and antimicrobial essential oils.

3. The film according to claim 1 or 2, wherein the antimicrobial agent is selected from the group consisting of immunoglobulin Y (IgY), chitosan, and combinations thereof.

4. The film according to claim 3, wherein the antimicrobial agent comprises immunoglobulin Y (IgY).

5. The film according to claim 4, wherein IgY is an IgY against a bacterium, virus, or fungus.

6. The film according to claim 5, wherein the virus is selected from the group consisting of SARS-associated coronavirus, SARS-COV, SARS-COV-2, influenza A, influenza type A H1N1, influenza type A H3N2, influenza type B victoria, and influenza type B yamagata.

7. The film according to claim 5, wherein the bacterium is a spoilage or contamination bacterium.

8. The film according to claim 7, wherein the spoilage bacterium is selected from the group consisting of *Escherichia coli, Shewanella putrefaciens, Pseudomonas Fluorescens, Photobacterium phosphoreum, Listeria monocytogenes*, Lactic Acid Bacteria, and *Clostridium Botulinum*.

9. The film according to claim 8, wherein the spoilage bacterium is *E. coli*.

10. The film according to claim 9, wherein the IgY against *E. coli* is isolated from a chicken egg yolk produced in a chicken that was immunized with whole deactivated *E. coli* bacteria.

11. The film according to claim 1, wherein the antimicrobial agent is chemically linked to the surface by a covalent bond.

12. The film according to claim 11, wherein the antimicrobial agent is chemically linked to the surface by an amide bond.

13. The film according to claim 1, wherein the polymer film comprises a polymer selected from the group consisting of polybutylene adipate terehthalate (PBAT), polylactic acid, polyhydroxyalkanoates, polybutylene succinate, cellulose-based materials, polyglycolic acid, polycaprolactone, polyvinyl alcohol, carbohydrate-based materials, protein-based materials, polyethylene, polypropylene, polyvinyl chloride, polyethylene terephthalate, polystyrene, and combinations thereof.

14. The film according to claim 13, wherein the polymer is PBAT.

15. The film according to claim 1, wherein the film is substantially free of inorganic components.

16. The film according to claim 1, wherein the film is completely free of inorganic components.

17. The film according to claim 1, wherein the film is completely free of antibioti drugs.

18. The film according to claim 1, wherein the film is compostable.

19. The film according to claim 1, wherein the film is for use in a packaging product selected from the group consisting of films, trays, and solid backing.

* * * * *